US012726075B2

(12) United States Patent
Ito

(10) Patent No.: US 12,726,075 B2
(45) Date of Patent: Sep. 1, 2026

(54) TERMINAL BLOCK WITH SPLIT-TYPE FERRITE CORE ASSEMBLY

(71) Applicant: TOYOTA JIDOSHA KABUSHIKI KAISHA, Toyota (JP)

(72) Inventor: Sho Ito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 152 days.

(21) Appl. No.: 18/631,837

(22) Filed: Apr. 10, 2024

(65) Prior Publication Data

US 2024/0356405 A1 Oct. 24, 2024

(30) Foreign Application Priority Data

Apr. 18, 2023 (JP) ................................ 2023-068140

(51) Int. Cl.

*H02M 1/44* (2007.01)
*H02K 5/22* (2006.01)
*H02K 7/00* (2006.01)
*B60K 6/26* (2007.10)

(52) U.S. Cl.

CPC ............. *H02K 5/225* (2013.01); *H02K 7/006* (2013.01); *B60K 6/26* (2013.01); *B60Y 2200/92* (2013.01); *B60Y 2400/602* (2013.01)

(58) Field of Classification Search

CPC .......... H02K 5/225; H02K 5/22; H02K 7/006; H02K 11/33; H02K 11/30; H02M 1/44; H02M 7/003; H02M 7/42; H01F 27/34; H01F 27/24; H01F 27/266; B60K 6/26; B60Y 2200/92; B60Y 2400/602

USPC ........................................................... 310/71

See application file for complete search history.

(56) References Cited

U.S. PATENT DOCUMENTS

| | | | | |
|---|---|---|---|---|
| 2018/0090257 | A1 | 3/2018 | Ishihara et al. | |
| 2022/0209437 | A1* | 6/2022 | Giambrone | B60R 16/02 |
| 2024/0039184 | A1* | 2/2024 | Abe | H02K 5/225 |
| 2024/0339983 | A1* | 10/2024 | Furukawa | H03H 7/0115 |

FOREIGN PATENT DOCUMENTS

| | | | |
|---|---|---|---|
| JP | S38-024762 | Y | 11/1963 |
| JP | S60-186807 | U | 12/1985 |
| JP | H01-089475 | U | 6/1989 |
| JP | 2010-209788 | A | 9/2010 |

(Continued)

OTHER PUBLICATIONS

Machine translation of JP-2017188494-A (Year: 2017).*

*Primary Examiner* — Michael Andrews

(74) *Attorney, Agent, or Firm* — Dinsmore & Shohl LLP

(57) ABSTRACT

A drive unit includes: (a) a rotary electric machine; (b) an electric-power control device configured to control driving of the rotary electric machine; (c) a casing that houses the electric-power control device; (d) a terminal block fixed to the casing, and provided with a plurality of connection lines to which an output of the electric-power control device is to be supplied; and (e) a split-type ferrite core assembly including an annular ferrite core surrounding the plurality of connection lines by extending in a circumferential direction around a direction in which the plurality of connection lines extend. The terminal block and the ferrite core assembly are fastened together to the casing by a fastener.

2 Claims, 5 Drawing Sheets

(56) References Cited

FOREIGN PATENT DOCUMENTS

| | | | | |
|---|---|---|---|---|
| JP | 2010-233293 | A | | 10/2010 |
| JP | 2017188494 | A | * | 10/2017 |
| JP | 2018-050417 | A | | 3/2018 |
| JP | 2022-158333 | A | | 10/2022 |

* cited by examiner

TERMINAL BLOCK WITH SPLIT-TYPE FERRITE CORE ASSEMBLY

CROSS-REFERENCE TO RELATED APPLICATION

This application claims priority from Japanese Patent Application No. 2023-068140 filed on Apr. 18, 2023, the disclosure of which is herein incorporated by reference in its entirety.

TECHNICAL FIELD

The present disclosure relates to a drive unit including an electric-power control device configured to control driving of a rotary electric machine, a casing that houses the electric-power control device, and a terminal block fixed to the casing.

BACKGROUND

There is known a drive unit that includes an electric-power control device configured to control driving of a rotary electric machine, a casing that houses the electric-power control device, and a terminal block fixed to the casing. Such a drive unit is disclosed in Patent Document 1, for example.

PRIOR ART DOCUMENT

Patent Document

Patent Document 1

Japanese Patent Application Laid-Open No. 2022-158333

SUMMARY

In the drive unit disclosed in Patent Document 1, noise generated in the electric-power control device, so-called electromagnetic compatibility (EMC) noise, is propagated as conduction noise to a stator of the rotary electric machine via a plurality of connection lines included in the terminal block. Hereinafter, in the present specification, the EMC noise is simply referred to as "noise". The conduction noise propagated to the stator of the rotary electric machine is propagated to drive shafts via a rotor, a rotor shaft, bearings, a casing and the like of the rotary electric machine. The conduction noise propagated to the drive shaft is radiated into air as radiation noise. If the radiated noise is large, it may affect peripheral equipment. In addition, it is also desirable to suppress an increase in a size of the drive unit, while suppressing propagation of the noise generated in the electric-power control device.

The present disclosure has been made in view of the above circumstances, and an object of the present disclosure is to provide a drive unit capable of suppressing propagation of noise generated in an electric-power control device while suppressing an increase in a size of the drive unit.

The present disclosure provides a drive unit including: (a) a rotary electric machine; (b) an electric-power control device configured to control driving of the rotary electric machine; (c) a casing that houses the electric-power control device; (d) a terminal block fixed to the casing, and provided with a plurality of connection lines to which an output of the electric-power control device is to be supplied; and (c) a split-type ferrite core assembly including an annular ferrite core surrounding the plurality of connection lines by extending in a circumferential direction around a direction in which the plurality of connection lines extend. The terminal block and the ferrite core assembly are fastened together to the casing by a fastener.

According to the drive unit of the present disclosure, the terminal block is provided with the plurality of connection lines to which the output of the electric-power control device is to be supplied; and the split-type ferrite core assembly is provided to include the annular ferrite core surrounding the plurality of connection lines by extending in the circumferential direction around the direction in which the plurality of connection lines extend. Further, the terminal block and the ferrite core assembly are fastened together to the casing by the fastener. Since the ferrite core assembly is split type, shapes of the plurality of connection lines are less likely to be limited, and the ferrite core assembly is easily attached and detached. For example, it is easy to change the ferrite core assembly to a ferrite core assembly having a different impedance characteristic so as to be suitable for suppressing propagation of noise generated in the electric-power control device depending on type of the drive unit. Since the terminal block and the ferrite core assembly are fixed to the casing by co-fastening, an increase in the size of the drive unit is suppressed as compared with an arrangement in which the ferrite core assembly is fixed to the casing separately from the terminal block. Therefore, it is possible to suppress propagation of noise generated in the electric-power control device while suppressing an increase in the size of the drive unit.

BRIEF DESCRIPTION OF THE DRAWINGS

FIG. 2 is a view for explaining an example of an electrical configuration of an electric-power control device and the like;

DETAILED DESCRIPTION OF EMBODIMENTS

Hereinafter, embodiments of the present disclosure will be described in detail with reference to the drawings. In each embodiment, the drawings are simplified or modified as appropriate, and the dimensional ratio, shape, and the like of each part are not necessarily accurately drawn.

First Embodiment

Figure 1:
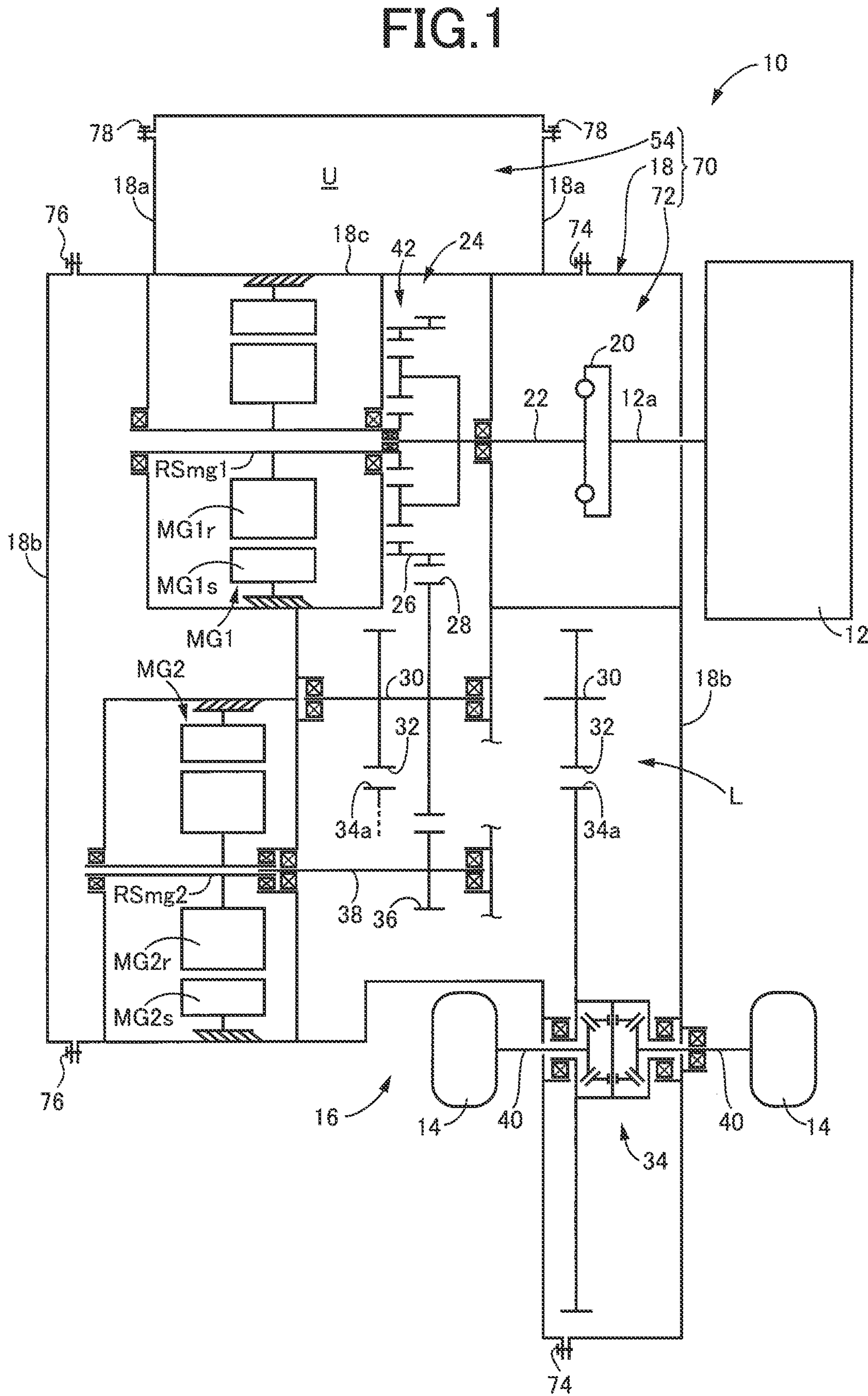
FIG. 1 is a view for explaining an example of a construction of a vehicle on which a drive unit according to a first embodiment of the present disclosure is mounted.

FIG. 1 is a view for explaining an example of a construction of a vehicle 10 on which a drive unit 70 according to a first embodiment of the present disclosure is mounted.

The vehicle 10 is a hybrid electric vehicle including an engine 12 that functions as a power source, and a first motor MG1 and a second motor MG2 that are motors that function as power sources. The vehicle 10 includes a pair of drive wheels 14 and a power transmission device 16. The engine 12 is a known internal combustion engine. The first motor MG1 and the second motor MG2 are, for example, rotary electric machines having motor functions and power generator functions, and are so-called motor generators. The first motor MG1 and the second motor MG2 are the power sources for driving the vehicle 10, and are, for example, three phase synchronous motors. The first motor MG1 includes a stator MG1*s*, a rotor MG1*r* and a rotor shaft RSmg1 that is integrally connected to the rotor MG1*r*. The second motor MG2 includes a stator MG2*s*, a rotor MG2*r* and a rotor shaft RSmg2 that is integrally connected to the rotor MG2*r*. The first motor MG1 and the second motor MG2 are housed in a non-rotatable casing 18 which is a non-rotatable member attached to a body of the vehicle 10. Each of the first motor MG1 and the second motor MG2 corresponds to "rotary electric machine" in the present disclosure.

The power transmission device 16 includes a crankshaft 12*a*, a damper 20, an input shaft 22, a transmission portion 24, a composite gear 26, a driven gear 28, a driven shaft 30, a final gear 32 and a deferential gear device 34 which are housed in the casing 10 and which are arranged in this order of description from the engine 12 in a power transmission path between the engine 12 and the pair of drive wheels 14. Thus, the power transmission path between the engine 12 and the drive wheels 14 is provided by a known construction. The power transmission device 16 includes a rotor connection shaft 38, a reduction gear 36, the driven gear 28, the driven shaft 30, the final gear 32 and the deferential gear device 34 which are housed in the casing 10 and which are arranged in this order of description from the second motor MG2 in a power transmission path between the second motor MG2 and the pair of drive wheels 14. Thus, the power transmission path between the second motor MG2 and the drive wheels 14 is provided by a known construction. The rotor connection shaft 38 is connected to the rotor shaft RSmg2 by spline fitting so as not to be rotatable relative to the rotor shaft RSmg2. The power transmission device 16 includes a pair of drive shafts 40 connected to the differential gear device 34. These components of the power transmission device 16 are made of, for example, steel. The casing 18 is made of, for example, a casting of an aluminum alloy.

The transmission portion 24 includes a differential mechanism 42 that is constituted by a known single-pinion type planetary gear device. The transmission portion 24 is a known electric transmission mechanism in which an operating state of the first motor MG1 is controlled to control an operating state of the differentiating mechanism 42. The first motor MG1 may also function as a power source that outputs power to the pair of drive wheels 14 via the drive mechanism 42.

Components or members of the power transmission device 16, the first motor MG1 and the second motor MG2 are rotatably supported by the casing 18 via bearings. For example, lubricant, for example, automatic transmission fluid (ATF), stored in a bottom portion of the casing 18 (to be specific, a bottom portion of a lower space L described later) is scooped up by a differential ring gear 34*a* or the like so as to be used for lubrication of gears and bearings in the casing 18. Rotations of the gears in the casing 18 also causes the lubricant to be scattered around the gears.

Figure 2:
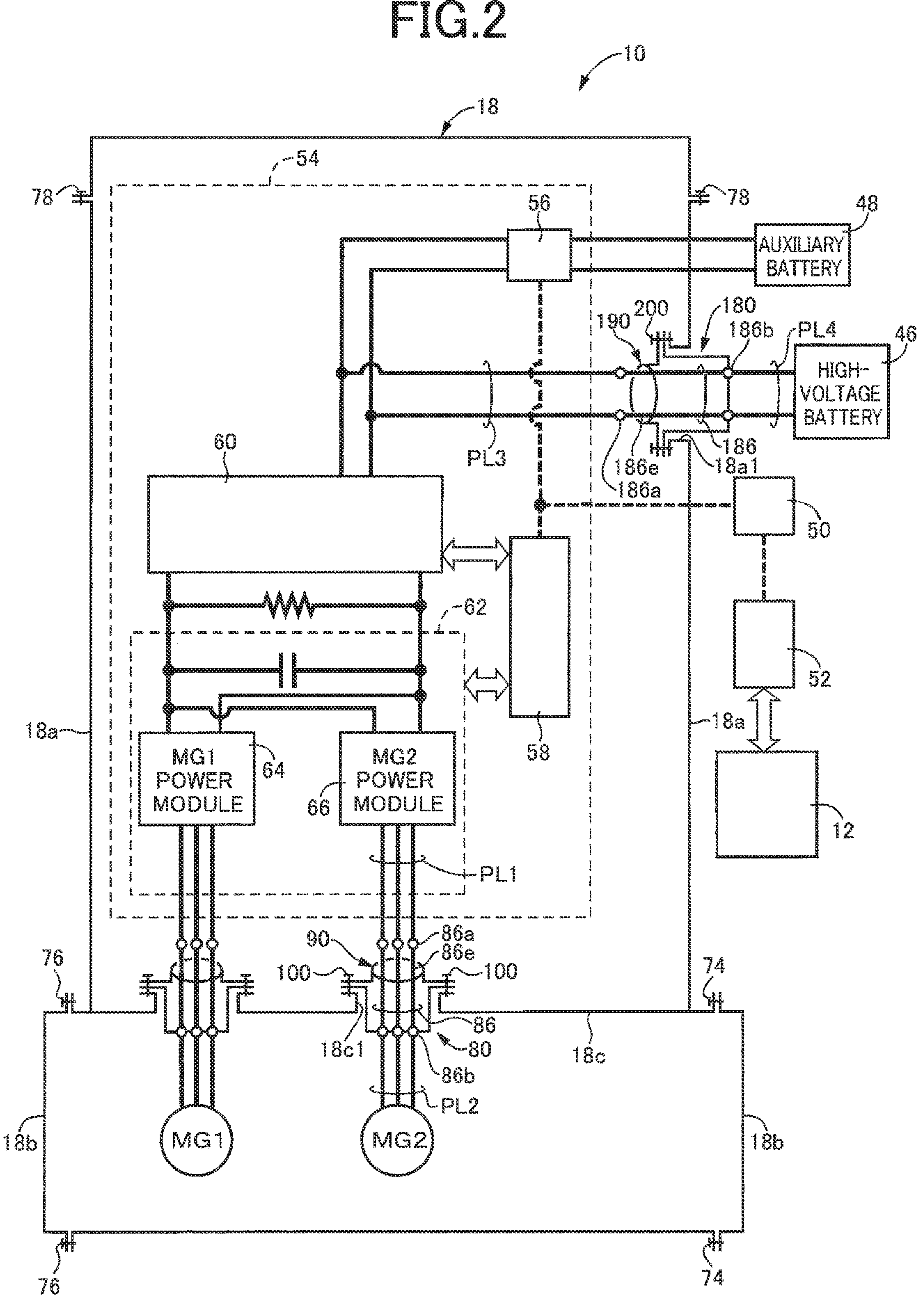

FIG. 2 is a view for explaining an example of an electrical configuration of an electric-power control device 54 and the like.

The vehicle 10 further includes a high-voltage battery 46, an auxiliary battery 48 and an electric-power control device 54. The high-voltage battery 46 is a chargeable and dischargeable secondary battery such as a nickel-hydrogen secondary battery or a lithium ion battery. The high-voltage battery 46 is connected to the electric-power control device 54 via third power lines PL3, a terminal block 180 and fourth power lines PL4. The high-voltage battery 46 is a battery for driving the first motor MG1 and the second motor MG2. For example, stored electric power is supplied from the high-voltage battery 46 to the second motor MG2 via the electric-power control device 54. Each of the first motor MG1 and the second motor MG2 generate electric power by the power of the engine 12 and driven force inputted from the pair of drive wheels 14, and the generated electric power is charged in the high-voltage battery 46 via the electric-power control device 54. The terminal block 180 will be described in detail in a second embodiment described later. The auxiliary battery 48 is a chargeable and dischargeable secondary battery such as a lead storage battery. The auxiliary battery 48 has a charging voltage lower than that of the high-voltage battery 46. The auxiliary battery 48 is charged with electric power generated by the engine 12 and electric power supplied from the high-voltage battery 46 via the fourth power lines PL4, the terminal block 180, the third power lines PL3 and the DC-DC converter 56.

The electric-power control device 54 controls driving of each of the first motor MG1 and the second motor MG2. The electric-power control device 54 includes a DC-DC converter 56, a boost converter 60, an inverter 62 and a motor control device 58. The electric-power control device 54 is an electric-power control device that controls electric power transferred between the high-voltage battery 46 and each of the first motor MG1 and the second motor MG2, that is, electric power supplied to and received by each of the first motor MG1 and the second motor MG2.

The DC-DC converter 56 is connected to the high-voltage battery 46. The DC-DC converter 56 functions as a charging device that charges the auxiliary battery 48, by reducing a voltage of the high-voltage battery 46 to a voltage equivalent to that of the auxiliary battery 48. The auxiliary battery 48 supplies electric power for operating auxiliary devices provided in the vehicle 10. The auxiliary battery 48 supplies electric power for operating, for example, an engine control device 52 and the motor control device 58.

The boost converter 60 includes a reactor and a switching element (not shown). The boost converter 60 is a step-up/down circuit having a function of increasing the voltage of the high-voltage battery 46 and supplying the increased voltage to the inverter 62, and a function of reducing the voltage converted into a direct current by the inverter 62 and supplying the reduced voltage to the high-voltage battery 46.

The inverter 62 includes an MG1 power module 64 and an MG2 power module 66. Each of the MG1 power module 64 and the MG2 power module 66 includes a switching element (not shown). The MG2 power module 66 is connected to the second motor MG2 via first power lines PL1, a terminal block 80 and second power lines PL2. The inverter 62 converts the direct current outputted from the boost converter 60 into alternating current for driving the first motor MG1 and the second motor MG2. The inverter 62 converts the alternating current generated by the first motor MG1 and the alternating current generated by the second motor MG2 into direct current. The inverter 62 uses the electric power generated by the first motor MG1 as electric power for driving the second motor MG2 in accordance with a running state of the vehicle 10.

An electronic control device 50 supplies and receives signals to and from the DC-DC converter 56, the motor control device 58 and the engine control device 52 via, for example, a known controller area network (CAN) communication line. The electronic control device 50 controls the running state of the vehicle 10 based on signals from sensors (not shown), for example. The electronic control device 50 controls, for example, the DC-DC converter 56 to reduce the voltage of the high-voltage battery 46 to a voltage equivalent to that of the auxiliary battery 48. In the present embodiment, the electronic control device 50 and the engine control device 52 are control devices separated from the electric-power control device 54, particularly, the motor control device 58.

The motor control device 58 controls the first motor MG1 and the second motor MG2 based on a power demand value supplied from the electronic control device 50. For example, the motor control device 58 controls the boost converter 60 and the inverter 62 to control outputs of the first motor MG1 and the second motor MG2.

Referring back to FIG. 1, the transaxle 72 is a drive device including the power transmission device 16 (the transmission portion 24, the composite gear 26, the driven gear 28, the driven shaft 30, the final gear 32 and the like), the first motor MG1 and the second motor MG2. The drive unit 70 is a mechanically and electrically integrated unit, i.e., a unit in which the transaxle 72 and the electric-power control device 54 are integrated and housed in the same casing 18.

The casing 18 is formed by integrally connecting a plurality of members by fasteners such as bolts 74, 76, 78. An inside of the casing 18 is divided into upper and lower parts in a vertical direction by a partition wall 18*c*. The casing 18 has an upper space U and a lower space L which are separated from each other in the vertical direction by the partition wall 18*c*. A sidewall of the casing 18 that defines the upper space U is a sidewall 18*a*, and another sidewall of the casing 18 that defines the lower space L is a sidewall 18*b*. The partition wall 18*c* is a common partition provided to define a lower end of the upper space U and also an upper end of the lower space L. Therefore, when the upper space U and the lower space L are separated from each other in the casing 18, at least one of the upper space U and the lower space Lis necessarily exposed to an outside of the casing 18. The "same casing" means a casing in which at least one of the upper space U and the lower space L is exposed to the outside when the upper space U and the lower space L are separated from each other as described above.

Referring back to FIG. 2, when being installed in the vehicle 10, the electric-power control device 54 is accommodated in the upper space U, and the transaxle 72 is accommodated in the lower space L. In the casing 18, the transaxle 72 is mounted in the lower space L before an opening portion provided in an opposite portion of the sidewall 18*b* which is opposite to the engine 12 is closed. In the casing 18, the electric-power control device 54 is mounted in the upper space U before an opening portion provided on an upper surface that defines the upper space U is closed.

Figure 3:
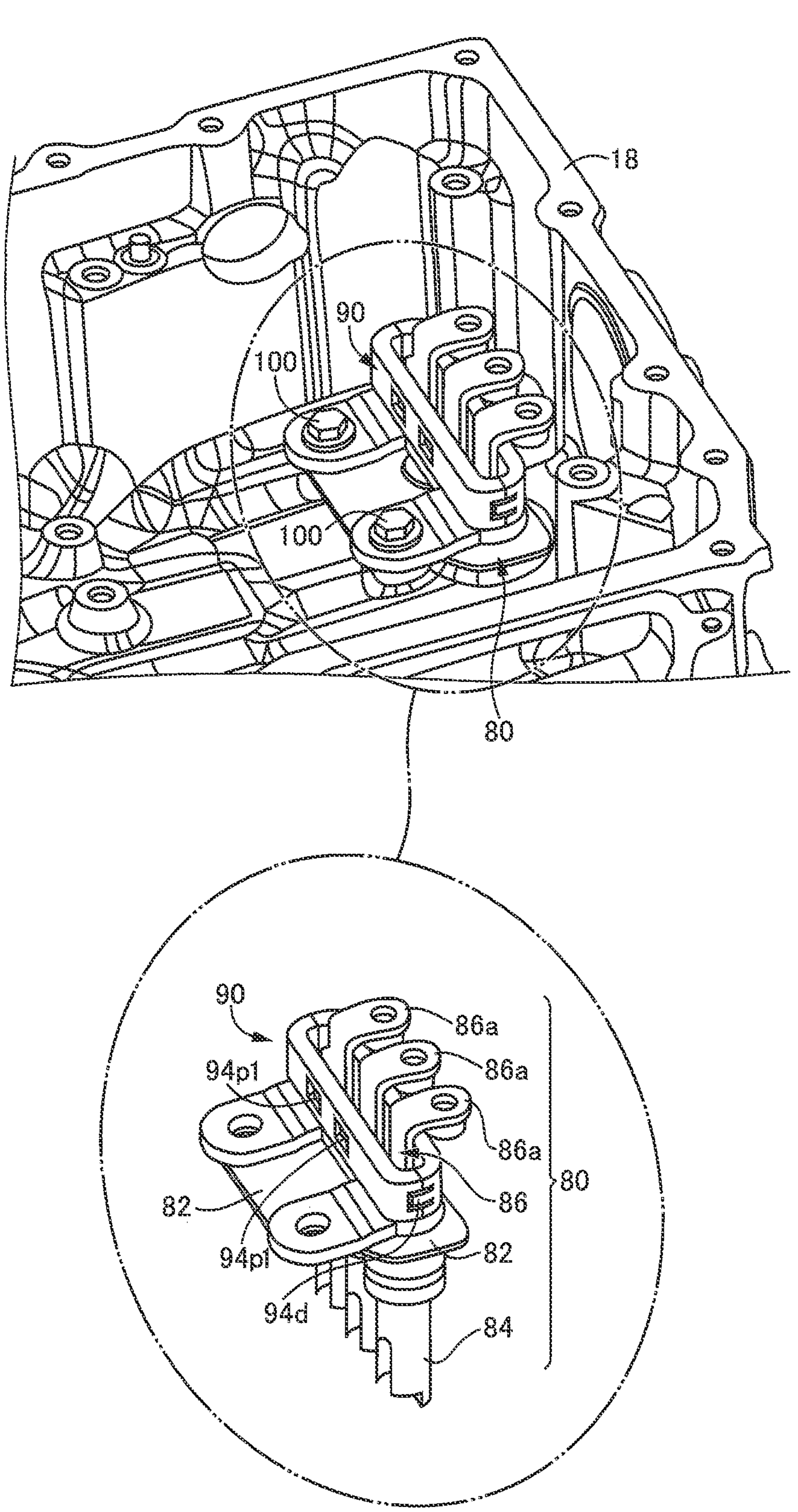
FIG. 3 is a perspective view for explaining a state in which a terminal block and a ferrite core assembly are fastened together to a partition wall of a casing.
Figure 4:
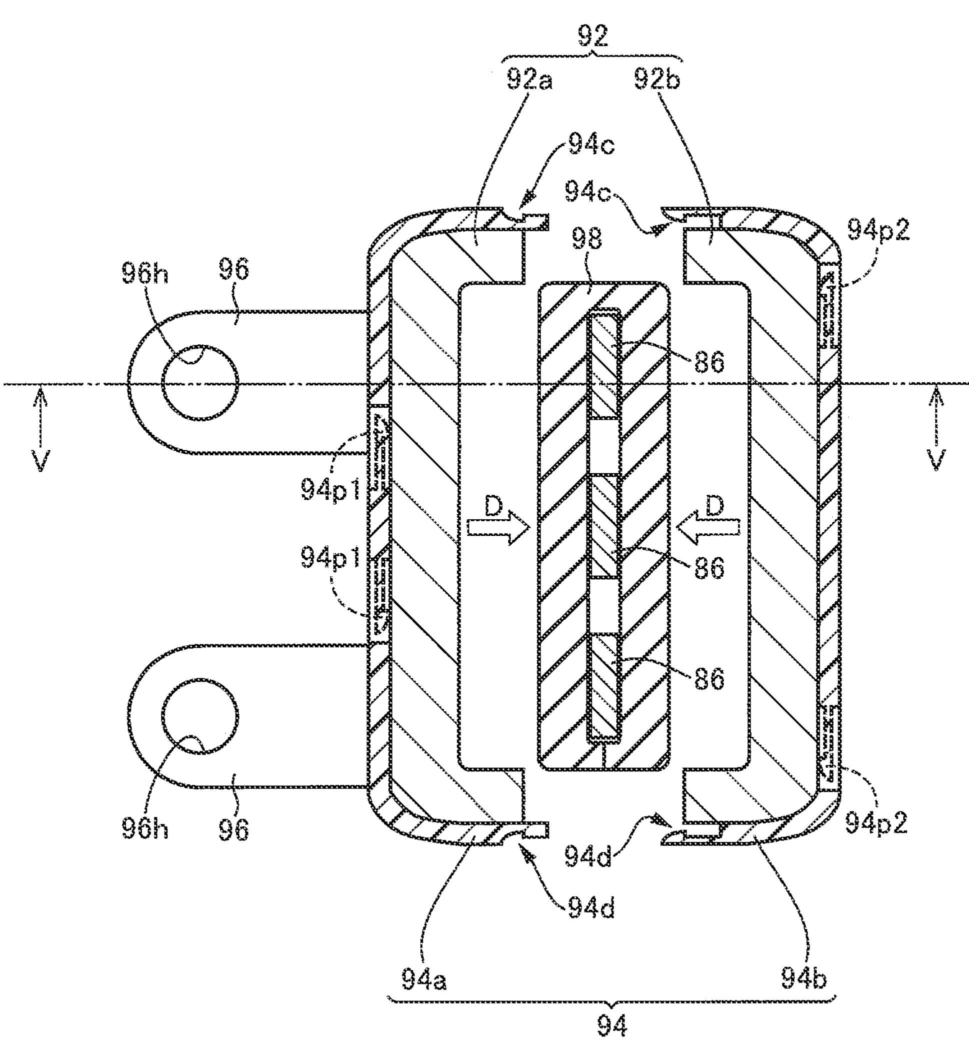
FIG. 4 is a view for explaining constructions of a terminal block and a ferrite core assembly, wherein the view is a cross-sectional view perpendicular to a direction in which extending portions of bus bars extend.
Figure 5:
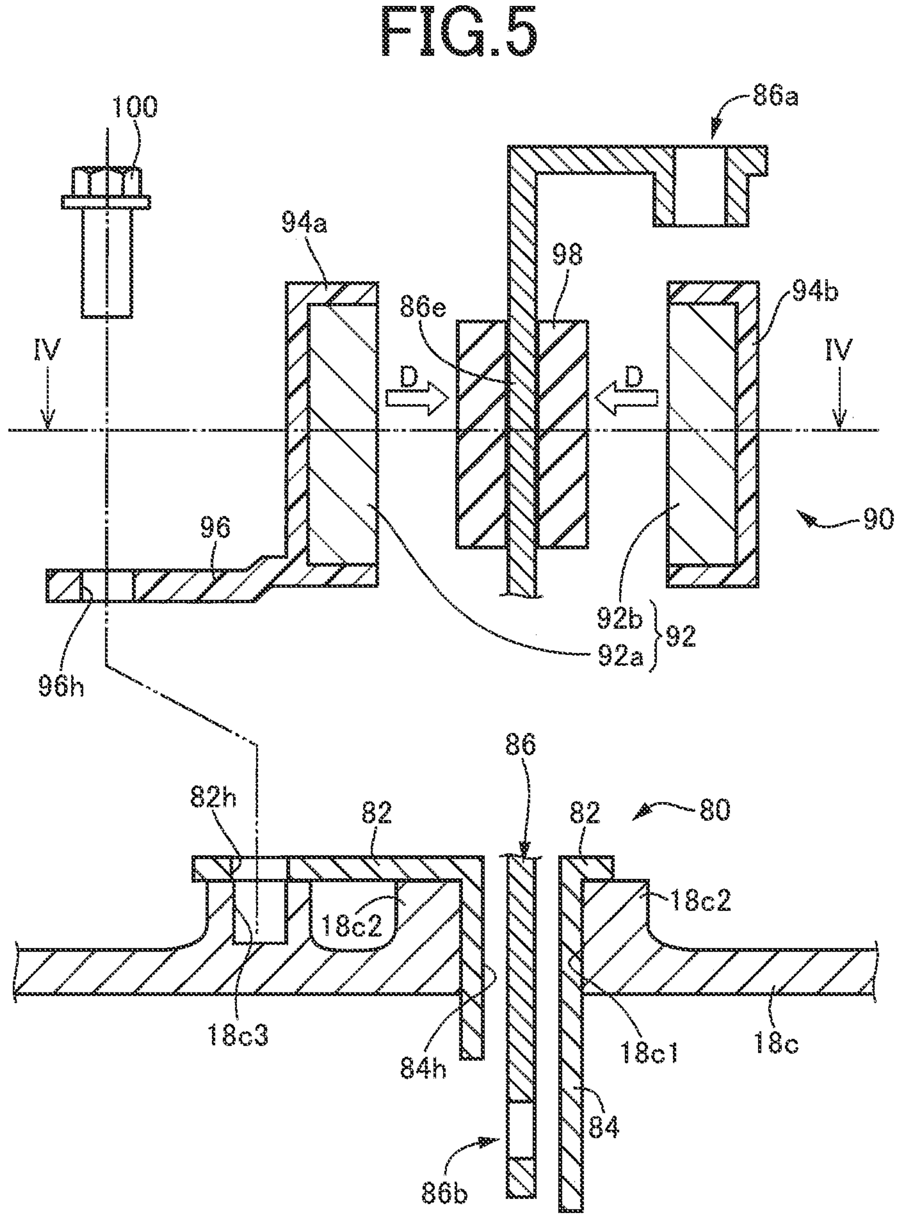
FIG. 5 is a view for explaining the constructions of the terminal block and the ferrite core assembly, wherein the view is a cross-sectional view taken along line V-V shown in FIG. 4.

FIG. 3 is a perspective view for explaining a state in which the terminal block 80 and a ferrite core assembly 90 are fastened to the partition wall 18*c*. An upper part of FIG. 3 shows a state in which the terminal block 80 and the ferrite core assembly 90 are fastened together to the partition wall 18*c* by common bolts 100, and a lower part of FIG. 3 shows a state in which the terminal block 80 and the ferrite core assembly 90 are fastened together to the partition wall 18*c*. FIG. 4 is a cross-sectional view of the ferrite core assembly 90 taken along a plane perpendicular to a direction in which an extending portion 86*e* of each bus bar 86 extends. FIG. 5 is a view for explaining constructions of the terminal block 80 and the ferrite core assembly 90, wherein the view is a cross-sectional view taken along line V-V shown in FIG. 4. FIG. 4 is a cross-sectional view taken along line IV-IV shown in FIG. 5. Note that, in FIG. 4, the construction of the terminal block 80 other than the bus bars 86 is not shown. FIGS. 4 and 5 show a state before the terminal block 80 and the ferrite core assembly 90 are fastened to the partition wall 18*c*.

The terminal block 80 is provided between the MG2 power module 66 of the electric-power control device 54 and the stator MG2*s* of the second motor MG2. The terminal block 80 is fixed to the partition wall 18*c*. The terminal block 80 is used to connect between the first power lines PL1 (located inside the upper space U) and the second power lines PL2 (located outside the upper space U). A terminal block having the same construction as the terminal block 80 is provided between the MG1 power module 64 of the electric-power control device 54 and the stator MG1*s* of the first motor MG1. The construction of the terminal block 80 will be described below as a representative example. The terminal block 80 corresponds to "terminal block" in the present disclosure. The partition wall 18*c* corresponds to "casing" in the present disclosure.

The partition wall 18*c* is provided with a through-hole 18*cl*. The through-hole 18*cl* is a hole through which a tubular portion 84 of the terminal block 80 can be inserted. A step portion 18*c*2 (see FIG. 5) is provided in an upper portion of the partition wall 18*c* so as to surround a periphery of the through-hole 18*cl*. The step portion 18*c*2 is, for example, a portion of the partition wall 18*c* which is thicker than a surrounding portion surrounding the step portion 18*c*2 and which is raised upwardly, and an upper surface of the step portion 18*c*2 is flush, for example. The partition wall 18*c* is provided with two fastening holes 18*c*3 (see FIG. 5).

The terminal block 80 includes a plate-shaped portion 82 and the plurality of (three in the present embodiment) tubular portions 84. The terminal block 80 is made of, for example, a metal that has a relatively high hardness and is not easily elastically deformed. A lower surface of the plate-shaped portion 82 is a plate that can cover the upper surface of the step portion 18*c*2. The tubular portions 84 are tubular and extend in the same direction from the lower surface of the plate-shaped portion 82. The plate-shaped portion 82 is provided with holes respectively connected to hollow portions of the three tubular portions 84. The through-hole 84*h* is a through-hole in which a hole provided in the plate-shaped portion 82 and a hollow portion of the tubular portion 84 are connected to each other.

The terminal block 80 includes the bus bars 86 that are inserted through the through-holes 84*h*. Each of the bus bars 86 extends to the inside and the outside of the upper space U. Each of the bus bars 86 is, for example, a plate-like body made of a metal having conductivity. When the electric-power control device 54 controls the driving of the second motor MG2, the output of the electric-power control device 54 is supplied to the bus bars 86. The bus bars 86 are connection lines through which three-phase alternating current of U phase, V phase and W phase is caused to pass in the terminal block 80.

The bus bars 86 are inserted through the through-holes 84*h*, and portions of the bus bars 86 extending toward the inside of the upper space U extend in the same direction. In the bus bars 86, the portions extending in the same direction are the extending portion 86*e*. In the present embodiment, a circumferential direction around the extending portions 86*e* of the three bus bars 86 is simply referred to as "circumferential direction". Each of the bus bars 86 has a first connecting portion 86*a* in an end portion in a longitudinal direction thereof, and has a second connecting portion 86*b* in another end portion in the longitudinal direction thereof. Each of the first power lines PL1 (see FIG. 2) can be connected to the first connecting portion PL1 in the end portion of the bus bar 86 on the inner side of the upper space U. In the present embodiment, the first connecting portion 86*a* is a distal end portion of the bus bar 86 that is bent by 90° in a plate thickness direction in a portion where the bus bar 86 extends into the upper space U through the through-hole 84*h*. The first connecting portion 86*a* is provided with a hole so that a crimping terminal attached to an end portion of the first power line PL1 can be electrically connected by a bolt (not shown), for example. The second connecting portion 86*b* is connectable to each of the second power lines PL2 (see FIG. 2) at an end portion of the bus bar 86 on the outer side of the upper space U, that is, on the inner side of the lower space L. In the present embodiment, the second connecting portion 86*b* is an end portion of a portion of the bus bar 86 that extends downwardly through the through-hole 84*h*. The second connecting portion 86*b* is provided with a hole so that a crimping terminal attached to an end portion of the second power line PL2 can be electrically connected by a bolt (not shown), for example. The bus bars 86 correspond to "connection lines" in the present disclosure.

For example, an O-ring (not shown) made of rubber is fitted between an inner peripheral surface of the tubular portion 84 and an outer peripheral surface of the bus bar 86 inserted through the through-hole 84*h*. Thus, the lower space Lis sealed in an oil-tight manner.

The plate-shaped portion 82 is provided with through-holes 82*h* (see FIG. 5) corresponding to positions of the fastening holes 18*c*3 provided in the partition wall 18*c*.

The ferrite core assembly 90 includes an annular ferrite core 92, a holding member 94 and attachment portions 96.

The annular ferrite core 92 is an annular ferrite core. The ferrite core is a magnetic body made of ferrite, and is a well-known ferrite core made of, for example, Ni—Zn. The annular ferrite core 92 includes a first core portion 92*a* and a second core portion 92*b*. The first core portion 92*a* and the second core portion 92*b* have shapes of one and the other of two parts into which an annular ferrite core is divided, respectively. Each of the first and second core portions 92*a*, 92*b* has, for example, an arc-like shape in which a plate-shaped body is bent in a plate thickness direction.

The holding member 94 includes a first holding portion 94*a* that holds the first core portion 92*a* and a second holding portion 94*b* that holds the second core portion 92*b*. The holding member 94 (the first holding portion 94*a* and the second holding portion 94*b*) is made of, for example, a synthetic resin.

Each of the first holding portion 94*a* and the second holding portion 94*b* is an arc-shaped plate body formed by bending a plate body in its plate thickness direction. Each of the first holding portion 94*a* and the second holding portion 94*b* is provided with a groove extending in its circumferential direction in its inner peripheral portion. The groove provided in the first holding portion 94*a* has a shape into which the first core portion 92*a* can be fitted. The groove provided in the second holding portion 94*b* has a shape into which the second core portion 92*b* can be fitted. In some embodiments, the first core portion 92*a* can be fitted into and removed from the groove of the first holding portion 94*a*. The second core portion 92*b* can be fitted into and removed from the groove of the second holding portion 94*b*.

The first holding portion 94*a* and the second holding portion 94*b* are provided with a pair of first engaging portions 94*c* and a pair of second engaging portions 94*d* so that they can be engaged with each other. For example, one of the pair of first engaging portions 94*c* is provided in an end portion of the first holding portion 94*a* in the circumferential direction, and one of the pair of second engaging portions 94*d* is provided at another end portion of the first holding portion 94*a* in the circumferential direction. For example, the other of the pair of first engaging portions 94*c* is provided in an end portion of the second holding portion 94*b* in the circumferential direction, and the other of the pair of second engaging portions 94*d* is provided in another end portion of the second holding portion 94*b* in the circumferential direction.

The attachment portions 96 are made of, for example, a synthetic resin, and are formed integrally with the first holding portion 94*a*. The attachment portions 96 are two plate-shaped portions protruding from the partition wall 18*c* side of the first holding portion 94*a* in a direction away from the second holding portion 94*b*. Each of the attachment portions 96 is provided with a through-hole 96*h* (see FIG. 5) corresponding to a position of the through-hole 82*h* of the plate-shaped portion 82.

The ferrite core assembly 90 is attached to the three bus bars 86, for example, in the following procedure. First, the first core portion 92*a* is fitted into the groove in the inner peripheral surface of the first holding portion 94*a*, and the second core portion 92*b* is fitted into the groove in the inner peripheral surface of the second holding portion 94*b*. A belt-like rubber 98 is wound so as to surround the extending portions 86*e* of the three bus bars 86. The rubber 98 is insulative. Next, the first holding portion 94*a* and the second holding portion 94*b* are pressed onto each other in directions indicated by arrows D shown in FIGS. 4 and 5 in a state in the rubber 98 wound around the three bus bars 86 is sandwiched. Thus, the pair of first engaging portions 94*c* are engaged with each other and the pair of second engaging portions 94*d* are engaged with to each other, so that the first holding portion 94*a* and the second holding portion 94*b* are fixed to each other so as not to be relatively movable, and the first core portion 92*a* and the second core portion 92*b* are fixed to each other to form an annular shape surrounding the extending portions 86*e* of the three bus bars 86. The rubber 98 is located between the three bus bars 86 and the first core portion 92*a* and between the three bus bars 86 and the second core portion 92*b*. The term "engaged" means to be connected or locked. Thus, the ferrite core assembly 90 is a split type in which the annular ferrite core 92 can be split. The "split type" means a structure in which in which the annular ferrite core can be splittably combined so as to detachably attach a plurality of bus bars. The rubber 98 corresponds to "elastic member" in the present disclosure.

The first holding portion 94*a* includes pressing portions 94*p*1, while the second holding portion 94*b* includes pressing portions 94*p*2. When the first holding portion 94*a* and the second holding portion 94*b* are fixed so as not to be relatively movable and the first core portion 92*a* and the second core portion 92*b* are fixed in the annular shape, the pressing portions 94*p*1 of the first holding portion 94*a* press the first core portion 92*a* to the second core portion 92*b*, and the pressing portions 94*p*2 of the second holding portion 94*b* press the second core portion 92*b* to the first core portion 92*a*. For example, each of the pressing portions 94*p*1, 94*p*2 uses flexibility. Each of the pressing portions 94*p*1 includes a protrusion protruding from a bottom surface of the groove of an inner peripheral portion of the first holding portion 94*a* to the inner peripheral side, and each of the pressing portions 94*p*2 includes a protrusion protruding from a bottom surface of the groove of an inner peripheral portion of the second holding portion 94*b* to the inner peripheral side.

The terminal block 80 and the ferrite core assembly 90 are fixed to the step portion 18*c*2 by being fastened together. In particular, the plate-shaped portion 82 is disposed so as to cover the step portion 18*c*2, and the attachment portion 96 of the ferrite core assembly 90 is disposed so as to cover the plate-shaped portion 82. Thereafter, the bolt 100 inserted through the through-hole 82*h* and the through-hole 96*h* is screwed into the fastening hole 18*c*3. The term "screwing" means that a male screw is twisted and rotated relative to a female screw so as to be brought into thread engagement with the female screw. In this way, the terminal block 80 and the ferrite core assembly 90 are fastened together to the partition wall 18*c* by the bolts 100. The bolt 100 corresponds to "fastener" in the present disclosure. Thus, the terminal block 80 is fixed to the partition wall 18*c* together with the ferrite core assembly 90 inside the upper space U.

Where the annular ferrite core 92 is fixed so as to surround the three bus bars 86, the annular ferrite core 92 act in the same manner as where a coil or coils are attached to the bus bars 86, and suppresses propagation of noise of a high-frequency component via the bus bars 86. That is, the annular ferrite core 92 functions as a noise filter. The function of the annular ferrite core 92 as a noise filter varies depending on material and shape of the annular ferrite core 92. For example, an impedance characteristic of the annular ferrite core 92 is changed by changing a cross-sectional area and an average magnetic path length of the annular ferrite core 92.

By the way, in the electric-power control device 54, for example, when switching elements included in the boost converter 60 and the inverter 62 are controlled to be switched at high speed, noise of a high-frequency component is generated. This noise is propagated as common mode noise from the first power lines PL1 to the second power lines PL2 via the bus bars 86. However, in the present embodiment, the ferrite core assembly 90 is provided so as to surround the three bus bars 86, and therefore, propagation of the noise generated in the electric-power control device 54 to the stator MG2*s* of the second motor MG2 via the bus bars 86 is suppressed.

For example, unlike the present embodiment, in a case where the ferrite core assembly 90 is not provided, the noise generated in the electric-power control device 54 is sequentially propagated to the stator MG2*s* (including the stator coil) of the second motor MG2, the rotor MG2*r* of the second motor MG2 and the rotor shaft RSmg2 via the bus bars 86. The noise propagated to the rotor shaft RSmg2 is propagated to the pair of drive shafts 40 via the bearings and the casing 18, or is propagated to the pair of drive shafts 40 via the power transmission path between the second motor MG2 and the pair of drive wheels 14. The noise propagated to the pair of drive shafts 40 is radiated into air as radiation noise. Since the pair of drive shafts 40 are cylindrical shaped, the drive shafts are more likely to radiate the radiation noise than the casing 18 having a box shape.

In the present embodiment, the terminal block 80 is provided with the three bus bars 86 to which the output of the electric-power control device 54 is to be supplied; and the split-type ferrite core assembly 90 is provided to include the annular ferrite core 92 surrounding the three bus bars 86 by extending in the circumferential direction. Further, the terminal block 80 and the ferrite core assembly 90 are fastened together to the partition wall 18*c* by the bolts 100. Since the ferrite core assembly 90 is split type, the shapes of the bus bars 86 are less likely to be limited, and the ferrite core assembly 90 is easily attached and detached. For example, the ferrite core assembly 90 can be easily changed to a ferrite core assembly 90 having a different impedance characteristic so as to be suitable for suppressing propagation of the noise generated in the electric-power control device 54 depending on type of the drive unit 70. Since the terminal block 80 and the ferrite core assembly 90 are fixed to the partition wall 18*c* by co-fastening, an increase in the size of the drive unit 70 is suppressed as compared with an arrangement in which the ferrite core assembly 90 is fixed to the partition wall 18*c* separately from the terminal block 80. Therefore, it is possible to suppress propagation of noise generated in the electric-power control device while suppressing an increase in the size of the drive unit. Therefore, it is possible to suppress propagation of the noise generated in the electric-power control device 54 while suppressing an increase in the size of the drive unit 70.

According to the present embodiment, the ferrite core assembly 90 has the first core portion 92*a* and the second core portion 92*b* formed by dividing the annular ferrite core 92, the first holding portion 94*a* holding the first core portion 92*a*, and the second holding portion 94*b* holding the second core portion 92*b*, such that the first holding portion 94*a* and the second holding portion 94*b* are engaged with each other to form the first core portion 92*a* and the second core portion 92*b* into the annular shape, and such that the first holding portion 94*a* has the pressing portions 94*p*1 pressing the first core portion 92*a* toward the second core portion 92*b* while the second holding portion 94*b* has the pressing portions 94*p*2 pressing the second core portion 92*b* toward the first core portion 92*a*. In this way, one of the first core portion 92*a* and the second core portion 92*b* is pressed toward the other by the pressing portions 94*p*1, 94*p*2, thereby reducing a gap between the first core portion 92*a* and the second core portion 92*b*, and according increasing the impedance of the annular ferrite core 92 with respect to high-frequency noise, which makes it easier to suppress propagation of the noise generated by the electric-power control device 54 toward the second motor MG2.

According to the present embodiment, the insulating rubber 98 is located between the three bus bars 86 and the first core portion 92*a* and between the three bus bars 86 and the second core portion 92*b*. Owing to provision of the rubber 98, the annular ferrite core 92 is prevented from being disposed to be biased to one side with respect to the center of the extending portion 86*e* of each bus bar 86 in the plate thickness direction of the extending portion 86*e* of each bus bar 86, as compared to a case of absence of the rubber 98. That is, the bus bars 86 and the annular ferrite core 92 can be easily assembled with a predetermined clearance between the annular ferrite core 92 and the extending portion 86*e* of each bus bar 86. This stabilizes the impedance characteristics of the annular ferrite core 92 against the noise of high-frequency components, and stably suppresses propagation of the noise generated in the electric-power control device 54 toward the second motor MG2.

Second Embodiment

The drive unit 70 according to this second embodiment is mounted on the vehicle 10 having the same construction as that of the first embodiment. This second embodiment is different from the first embodiment in that a terminal block

180 and a ferrite core assembly 190 are used in place of the terminal block 80 and the ferrite core assembly 90. Therefore, in the present second embodiment, description will be made focusing on parts different from the first embodiment, and substantially common parts are denoted by the same reference numerals and description thereof will be appropriately omitted.

The terminal block 180 has substantially the same construction as the terminal block 80, but is different in its fixed position. The terminal block 180 is a terminal block provided between the boost converter 60 of the electric-power control device 54 and the high-voltage battery 46. The terminal block 180 is fixed to the sidewall 18*a*. The terminal block 180 is used to connect between the third power lines PL3 located inside the upper space U and the fourth power lines PL4 located outside the upper space U. The terminal block 180 corresponds to "terminal block" in the present disclosure. The sidewall 18*a* corresponds to the "casing" in the present disclosure.

The tubular portion of the terminal block 180 is inserted through a through-hole 18*al* (see FIG. 2) formed in the sidewall 18*a*. The terminal block 180 includes two bus bars 186 each of which is inserted through the hollow portion of the tubular portion of the terminal block 180. Each of the bus bars 186 extends to the inside and outside of the upper space U. For example, when the high-voltage battery 46 is charged with the electric power generated by the second motor MG2 via the electric-power control device 54, the output of the electric-power control device 54 is supplied to the bus bars 186. The bus bars 186 are connection lines through which the direct current is caused to flow in the terminal block 180. In this second embodiment, the inside and outside of the upper space U do not need to be strictly sealed unlike in the first embodiment.

The bus bars 186 are inserted through the hollow portion of the cylindrical portion of the terminal block 180, and portions of the respective bus bars 510 extending to the inner side of the upper space U extend in the same direction. In the bus bars 186, the portions extending in the same direction are extending portion 186*e*. In this second embodiment, a circumferential direction around the extending portions 186*e* of the two bus bars 186" is simply referred to as "circumferential direction". Each of the bus bars 186 has a first connecting portion 186*a* in an end portion in the longitudinal direction and a second connecting portion 186*b* in another end portion in the longitudinal direction. The bus bars 186 correspond to the "connection lines" in the present disclosure.

The ferrite core assembly 190 has the same construction as the ferrite core assembly 90, and therefore, description thereof is omitted. The terminal block 180 and the ferrite core assembly 190 are fixed to the sidewall 18*a* by common bolts 200 (see FIG. 2). Each of the bolts 200 corresponds to "fastener" in the present disclosure.

According to the present second embodiment, the same effects as those of the above-described first embodiment are achieved by the same construction as that of the first embodiment. For example, unlike the present embodiment, in a case where the ferrite core assembly 190 is not provided, noise generated in the electric-power control device 54 is propagated to the fourth power lines PL4 via the bus bars 186. The noise propagated to the fourth power lines PL4 is radiated into the air as radiation noise. Since the terminal block 180 and the ferrite core assembly 190 are fixed to the sidewall 18*a* by co-fastening, it is possible to suppress propagation of noise generated in the electric-power control device 54 while suppressing an increase in the size of the drive unit 70.

The above embodiments are merely examples of the present disclosure, and the present disclosure can be implemented in various modified and improved forms based on the knowledge of those skilled in the art without departing from the scope of the present disclosure.

In the first and second embodiments described above, the ferrite core assembly 90, 190 is constructed such that the holding member 94 includes the first holding portion 94*a* and the second holding portion 94*b* that are separable from each other. However, the present disclosure is not limited to this construction. For example, an arrangement in which a hinge is provided instead of the pair of second engaging portions 94*d* in the holding member 94 in the first and second embodiments described above, that is, an arrangement in which the first holding portion 94*a* and the second holding portion 94*b* are connected by the hinge, may be adopted.

In the first and second embodiments described above, the first holding portion 94*a* has the pressing portions 94*p*1 and the second holding portion 94*b* has the pressing portions 94*p*2, but the disclosure is not limited thereto. For example, the first holding portion 94*a* may not include the pressing portions 94*p*1, and the second holding portion 94*b* may not include the pressing portions 94*p*2. In some embodiments, at least one of the first holding portion 94*a* and the second holding portion 94*b* may have a pressing portion or portions that press one of the first core portion 92*a* and the second core portion 92*b* against the other.

In the first and second embodiments, the rubber 98 is disposed between the three bus bars 86 and the annular ferrite core 92 of the ferrite core assembly 90 and between the two bus bars 186 and the annular ferrite core 92 of the ferrite core assembly 190, but the present disclosure is not limited thereto. For example, the rubber 98 may not be disposed between the three bus bars 86 and the annular ferrite core 92, that is, a gap may be formed between the three bus bars 86 and the annular ferrite core 92.

In the second embodiment described above, the terminal block 180 is provided between the boost converter 60 and the high-voltage battery 46. However, the present disclosure is not limited thereto, and the terminal block 180 may be provided between the DC-DC converter 56 and the auxiliary battery 48, for example.

In the first and second embodiments, the drive unit 70 is a mechanically and electrically integrated unit in which the transaxle 72 and the electric-power control device 54 are housed in the same casing 18 and integrated with each other. However, the present disclosure is not limited thereto. For example, the present disclosure is also applicable to an arrangement in which the transaxle 72 and the electric-power control device 54 are housed in separate casings. In this arrangement, a member that defines the space for housing the electric-power control device 54 corresponds to "casing" of the present disclosure.

In the first and second embodiments, the terminal block 80, 80 is fixed to the partition wall 18*c* and the sidewall 18*a* inside the upper space U together with the ferrite core assembly 90, 190. However, the present disclosure is not limited thereto. For example, the terminal block 80, 180 may be fixed to the partition wall 18*c* or the sidewall 18*a* outside the upper space U by being fastened together with the ferrite core assembly 90, 190.

In the first and second embodiments, the hybrid vehicle 10 includes the engine 12, the first motor MG1 and the second motor MG2 as the power sources. However, the present disclosure is not limited thereto. For example, the present disclosure is applicable to a vehicle that does not include the engine 12 but includes only an electric motor as a power source, that is, an electric vehicle.

In the first and second embodiments, the second motor MG2 corresponding to "rotary electric machine" of the present disclosure is a three-phase synchronous motor. However, the number of phases of the rotary electric machine is not necessarily three, and is not necessarily a synchronous motor. Further, for example, the second motor MG2 may be a rotary electric machine having only one of the motor and power generator functions.

In the first and second embodiments, the transaxle 72 includes two electric motors, i.e., the first motor MG1 and the second motor MG2. However, the present disclosure is not limited thereto. The transaxle 72 may include one electric motor or three or more electric motors. For example, the electric vehicle may be provided with only the second motor MG2 as the power source without the first motor MG1.

NOMENCLATURE OF ELEMENTS

18*a*: sidewall (casing)
18*c*: partition wall (casing)
54: electric-power control device
70: drive unit
80: terminal block
86: bus bar (connection line)
90: ferrite core assembly
92: annular ferrite core
92*a*: first core portion
92*b*: second core portion
94*a*: first holding portion
94*b*: second holding portion
94*p*1: pressing portion
94*p*2: pressing portion
98: rubber (elastic member)
100: bolt (fastener)
180: terminal block
186: bus bar (connection line)
200: bolt (fastener)
MG1: first motor (rotary electric machine)
MG2: second motor (rotary electric machine)

What is claimed is:

1. A drive unit comprising:

a rotary electric machine;

an electric-power control device configured to control driving of the rotary electric machine;

a casing that houses the electric-power control device;

a terminal block fixed to the casing, and provided with a plurality of connection lines to which an output of the electric-power control device is to be supplied; and a split-type ferrite core assembly including an annular ferrite core surrounding the plurality of connection lines by extending in a circumferential direction around a direction in which the plurality of connection lines extend, wherein the terminal block and the ferrite core assembly are fastened together to the casing by a fastener, wherein the ferrite core assembly includes first and second core portions into which the annular ferrite core is divided, a first holding portion holding the first core portion and a second holding portion holding the second core portion, wherein the first and second holding portions are engaged with each other such that the first and second core portions cooperate to form an annular shape, and wherein at least one of the first and second holding portions includes a pressing portion that presses one of the first and second core portions toward the other.

2. The drive unit according to claim 1, further comprising an insulating elastic member that is located between the plurality of connection lines and the first core portion and between the plurality of connection lines and the second core portion.

* * * * *